United States Patent

Campbell

[15] 3,699,519

[45] Oct. 17, 1972

[54] FINGERPRINT ANALYSIS DEVICE

[72] Inventor: Mark E. Campbell, Whittier, Calif.

[73] Assignee: North American Rockwell Corporation

[22] Filed: April 30, 1971

[21] Appl. No.: 139,109

[52] U.S. Cl. ..........................................340/146.3 E

[51] Int. Cl. ..............................................G06r 9/12

[58] Field of Search...........340/146.3 E; 235/61.11 E

[56] References Cited

UNITED STATES PATENTS 3,611,290 10/1971 Luisi et al............340/146.3 E

OTHER PUBLICATIONS

IBM Tech. Discl. Bull' n. entitled " Fingertip Orienting and Ridge Viewing Apparatus" , by Claassen and McLaughlin; Vol. 8 No. 3 August 1965, pages 435- 6

*Primary Examiner*—Thomas A. Robinson
*Attorney*—L. Lee Humphries, H. Frederick Hamann and Martin E. Gerry

[57] ABSTRACT

A fingerprint is observed, a small portion at a time, using a flying spot scanner, whose spot travels along a predetermined path at each position to provide an electrical analog signal indicative of the nature of the fingerprint at each position. The analog signal is converted into digital form and temporarily stored in a memory having a plurality of storage elements. The signal stored in the memory is constantly circulated through each of the storage elements to provide for detection of minutiae (i.e. ridge endings, bifurcations, etc.) regardless of their angular orientation. Detecting the occurrence of specified minutia is achieved by sensing the states of selected ones of the storage elements. A method is provided to utilize a finger from which the fingerprint is directly analyzed. Other means are provided to enable the fingerprint pattern to be observed directly and to make a copy of the fingerprint photographically and a combination of optical-electronic and electrostatic methods.

10 Claims, 9 Drawing Figures

INVENTOR
MARK E. CAMPBELL
BY Martin E Geary
AGENT

INVENTOR
MARK E. CAMPBELL
BY Martin E. Geiry
AGENT

INVENTOR
MARK E. CAMPBELL
BY Martin E. Geery
AGENT

INVENTOR
MARK E. CAMPBELL
BY Martin Ebeery [signature]
AGENT

INVENTOR
MARK E. CAMPBELL
BY Martin E. Geery
AGENT

INVENTOR
MARK E. CAMPBELL
BY
AGENT

INVENTOR
MARK E. CAMPBELL
BY Martin S. Gerber
AGENT

INVENTOR
MARK E. CAMPBELL
BY Martin E. Gerry
AGENT

FINGERPRINT ANALYSIS DEVICE

PRIOR RELATED PATENT

This is an improvement to U.S. Pat. No. 3,611,290, owned by the same assignee.

BACKGROUND OF THE INVENTION

The present invention relates to the detection of specified patterns within a given area and, more particularly, to a system for automatically providing an indication of the position and orientation of specified minutia in a fingerprint.

With crime in the United States and elsewhere on the upswing and with the relative supply of trained law enforcement personnel on the decline, the law enforcement community has been forced, in recent years, to investigate and consider the automatic processing of the large amounts of data it is required to maintain. One area of recent interest has been in the automatic processing of fingerprints. A few facts will serve to indicate why this is the case. The Federal Bureau of Investigation has a fingerprint file which consists of over 182,000,000 fingerprint cards, each having ten prints thereon. There are some 13,000 agencies throughout the world contributing fingerprint cards to the FBI and the FBI receives over 27,500 inquiries per day. In its Washington offices alone, the FBI has over 1000 people whose task it is to search and classify fingerprint cards. The California Bureau of Criminal Identification and Investigation has a file consisting of approximately 5,500,000 fingerprint cards and receives in excess of 95,000 inquiries per month. The New York State Identification and Intelligence System has a file in excess of 1,300,000 fingerprint cards and receives more than 200,000 inquiries per year. These figures alone serve to indicate the enormity of the task of reading and classifying fingerprints for the purposes of identification and matching.

Other areas would benefit from a device for automatically reading fingerprints. For example, the economy of the United States today is based on the credit system and the use of credit cards. However, millions of dollars are lost annually because of the use of lost or stolen credit cards. With an automatic fingerprint reader and correlator, much of this could be eliminated. Each credit card could be made so that upon insertion into a machine, a central storage file would automatically locate the file of the credit card owner which would include his or her fingerprint records. Then, by merely placing the credit card holder's finger on a glass or the like, an automatic reader could read the fingerprint and provide the information to a correlation system which would determine whether the fingerprint of the credit card holder matches those in the file of the credit card owner. With automatic reading and correlating apparatus, this could be done in a matter of seconds.

Because of the importance of this problem, many suggestions have been made in recent years for automatic fingerprint readers and recorders. Many of the proposed systems operate to locate fingerprint minutia, such as ridge endings or bifurcations, since the use of fingerprint minutia as a means of positive, legal identification has been proven in practice. Therefore, since the automatic detection of specified minutia is basically a problem in pattern recognition, it would appear to be a simple matter to provide an automatic system for the detection of such minutia. However, the recognition of these minutia is complicated by several factors, such as: (1) the specified minutia occur at arbitrary orientations; (2) there are variations in ridge breadth and distance between ridge centers; (3) there are various inherent defects in all fingerprints, such as scars, warts, etc.; (4) false ridge endings appear at the boundaries of fingerprints and scars; and (5) the quality of fingerprints varies widely with respect to contrast and clarity. As a result, in almost all cases, the proposed system has either been too complex, too inefficient or inoperative.

For example, it has been proposed to use a large scale computer to control the scan of a fingerprint along some predetermined pattern and to store the resulting complex electrical signal. Subsequently, in order to identify a fingerprint, it will have to be scanned and the resultant complex electrical signal compared with those in the memory banks of the computer. Although this approach may well be operative, it has the inherent disadvantage of all mass data processing systems, and that is the requirement for enormous amounts of complex and costly equipment.

Another suggested approach has been to use holographic techniques whereby two fingerprints may be matched or the location of specified minutia on fingerprints identified by simultaneously illuminating an unknown fingerprint and a known mask with coherent laser light and determining the locations of a match. However, apparently because of the complexity and the minute detail present in typical fingerprints, it has not been possible to make such a system which operates reliably.

Several other approaches have been suggested whereby a fingerprint is scanned along a predetermined pattern to find the location of specified minutiae therein, which locations may be read out and/or stored for classification and correlation. However, all previous systems have had to reach a compromise between the requirements of accuracy and the penalties of complexity. In other words, in order to provide a system which operated to generate an accurate indication of the location of the specified minutia, it has, heretofore, been necessary to provide extremely complex equipment. On the other hand, in order to provide relatively simple and trustworthy equipment, it has been necessary to accept a high degree of false indications.

U.S. Pat. No. 3,050,711 to Harmon uses a cathode ray scanner but places transducer elements about a plurality of circles. The result is that it is impossible with this approach to obtain scans of sufficiently small orbits at any one location of his transducer to effect character recognition of the type needed in fingerprint analysis. When it is considered that the diameter of a cathode ray beam is in the order of 0.001 inches, it can be understood why it is impossible to evaluate light and dark spots at any one location of the transducers used herein due to the practical dimension of the transducer itself being larger than the details of recognition required within the confines of any one transducer area.

U.S. Pat. No. 3,112,468 to Kamentsky shows a character recognition device, but the polar scan taken herein is an overall polar scan of the entire character or pattern. This art does not have embodied therein means for sequentially positioning the beam of the cathode ray spot scanner at coordinate locations along rectilinear axes including means for sequentially scanning the pattern at each of the coordinate locations with a plurality of scans wherein each of the scans are a plurality of successive polar scans having polar radii of different magnitudes for scanning a plurality of portions of each of the coordinate locations, which are needed to obtain the high resolution requirements of a fingerprint analysis or minutia device.

U.S. Pat. No. 2,838,602 to Sprick, although this is in character analysis field, is inadequate for fingerprint analysis requirements. It does not teach storing digital data for each point of each polar scan at each XY coordinate position and fails with respect to the need for providing means for sequentially comparing digital data for detecting a predetermined relationship between corresponding points of each polar scan. Further, this patent does not provide means for determining the angular orientation of a predetermined pattern relationship relative to a normal axis.

U.S. Pat. No. 3,370,271 to Van Dalen; No. 3,293,604 to Klein; No. 3,234,513 to Brust; and No. 3,496,541 to Haxby, appear to teach variations of linear scanning systems. A linear scanning system exclusively is not adequate for fingerprint analysis, it requires a sequence of ever diminishing areas of polar scans.

SUMMARY OF THE INVENTION

According to the present invention, there is provided a system for automatically providing an indication of the position and angular orientation of specified minutia in a fingerprint. The proposed system is fundamentally very simple and can be implemented with existing off-the-shelf, commercial, electronic components. The present system can be used to detect any type of minutia such as ridge endings and/or bifurcations, as required. The system will detect as many specified minutiae as possible with a minimum number of false alarms.

Briefly, the present fingerprint minutiae reading device operates by sequentially observing small portions of a fingerprint, with the use of a flying spot scanner, to derive, at each position, an electrical analog signal indicative of the pattern at the position. The analog signal, so derived, is converted into digital form and temporarily stored in a small memory having a plurality of storage elements. The signal in the memory is constantly circulated through each of the storage elements to aid in the recognition of minutiae regardless of their angular orientation. Finally, the occurrence of specified minutia is detected by sensing the states of selected ones of the storage elements. An automatic contrast control circuit adjusts the detection process as a function of the local quality of the fingerprint image to increase the probability of detection of minutiae in prints of relatively poor quality. The system includes apparatus to inhibit the recognition of false ridge endings in broken ridges, the terminations of ridges at the print boundaries, or the terminations of ridges produced by scars, and, if it becomes desirable to recognize the existence of scars, etc., the ridge endings produced by scars may be detected and recorded for later processing.

It is therefore an object of the present invention to provide a system for detecting specified patterns.

It is a further object of the present invention to provide a novel fingerprint minutiae reading device.

It is still another object of the present invention to provide a system for detecting the position and orientation of specified minutiae in a fingerprint.

It is another object of the present invention to provide a fingerprint minutiae reading device in which a digitized image of the fingerprint is stored in a temporary memory and in which the image in the memory is circulated to assist in the detection of minutiae having arbitrary angular orientations.

It is still another object of the present invention to provide a fingerprint minutia reading device which includes an automatic contrast control circuit to permit adaptation to the local quality of a fingerprint image.

Still another object of the present invention is the provision of a fingerprint minutiae reading device which may be implemented with existing off-the-shelf, commercial, electronic components.

Still other objects, features and attendant advantages of the present invention will become apparent to those skilled in the art from a reading of the following detailed description of the preferred embodiment constructed in accordance therewith, taken in conjunction with the accompanying drawings.

DESCRIPTION OF THE PREFERRED EMBODIMENT

Figure 1:
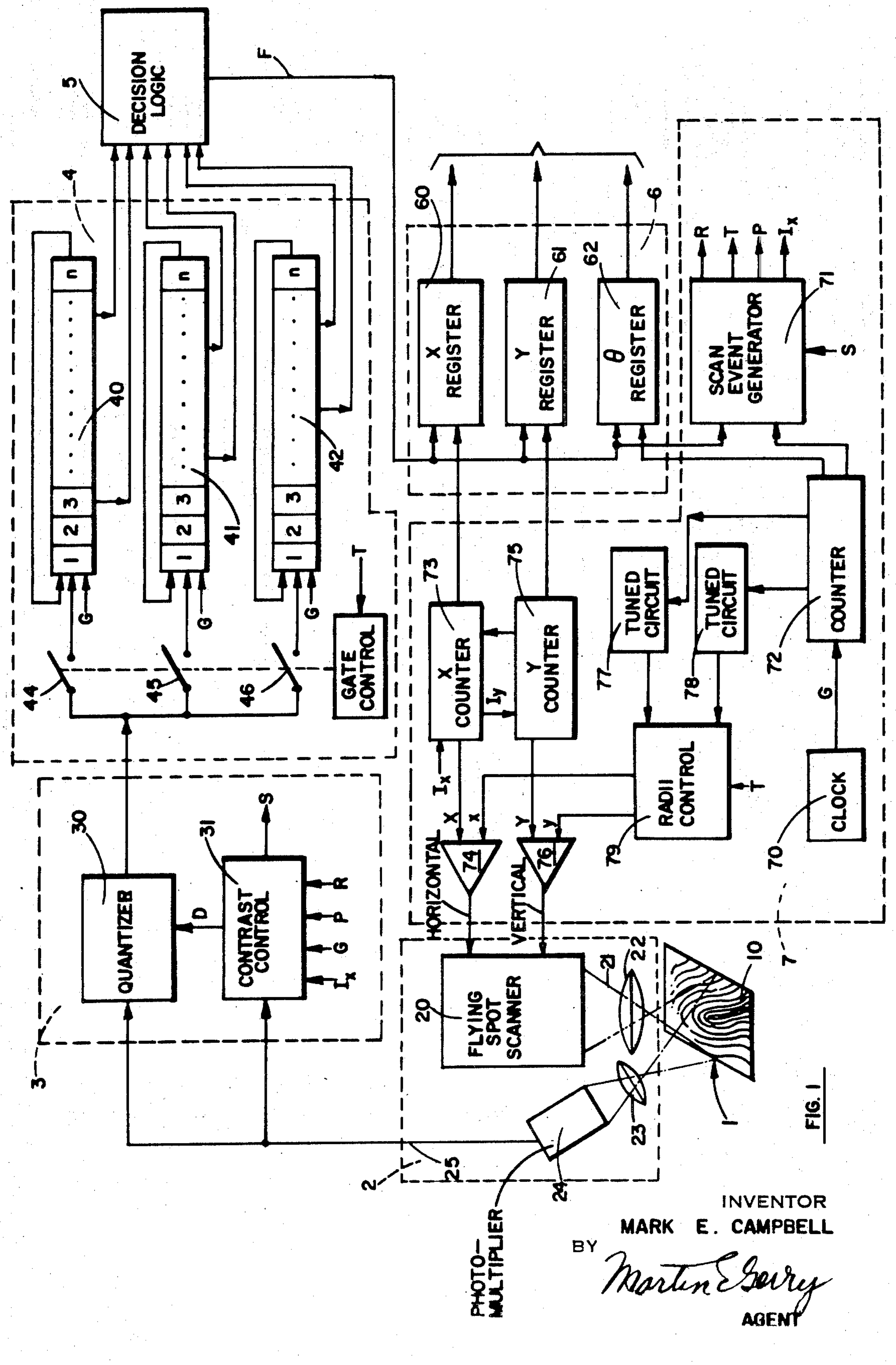
FIG. 1 is a block diagram of the present fingerprint minutiae reading device.

Referring now to the drawings and, more particularly, to FIG. 1 thereof, the proposed fingerprint minutiae reading device consists of an input device 1 which may, for example, be a manually operated fingerprint card, a scanning means 2 which may, for example, be a flying spot scanner, and a photomultiplier for scanning the entire fingerprint, a portion at a time, to derive, at each position, an analog signal indicative of the pattern at the position, a quantizer and associated contrast control 3 coupled to the output of scanning means 2 for transforming the analog signal to digital form, a temporary memory 4 which may, for example, consist of a plurality of digital shift registers, for temporarily storing samples from each small portion of the fingerprint, this digital representation being circulated through the shift registers so as to permit the detection of the specified minutia, if any, regardless of the angular orientation thereof, decision logic 5 coupled to memory 4 for sensing the states of selected stages of the shift registers, an output register 6 for providing a digital output indicative of the location and angular orientation of the detected minutia, and associated electronic circuitry 7 for controlling the entire system.

A fingerprint card 10 may be inserted into the present system manually and manipulated in any desired manner so that the fingerprint is positioned underneath flying spot scanner 20 and photomultiplier 24. The accuracy of positioning is not important since there is no requirement for recording the absolute coordinates of detected minutiae. Under the control of circuitry 7, flying spot scanner 20 causes a beam of light 21 to scan fingerprint card 10. A suitable lens 22 may be inserted between flying spot scanner 20 and fingerprint card 10 to focus beam 21 onto a spot of predetermined size. Scanning of fingerprint card 10 is accomplished in two modes. The first, X-Y mode, advances beam 21 digitally from point to point along a typical raster pattern by increments of any desired size. For example, there may be 600 steps in the $x$ direction and 500 steps in the $y$ direction, so that a total of 300,000 individual locations on the fingerprint are scanned. The coordinates for each set of observations are generated automatically by control circuitry 7, as will be explained more fully hereinafter.

Figure 2:
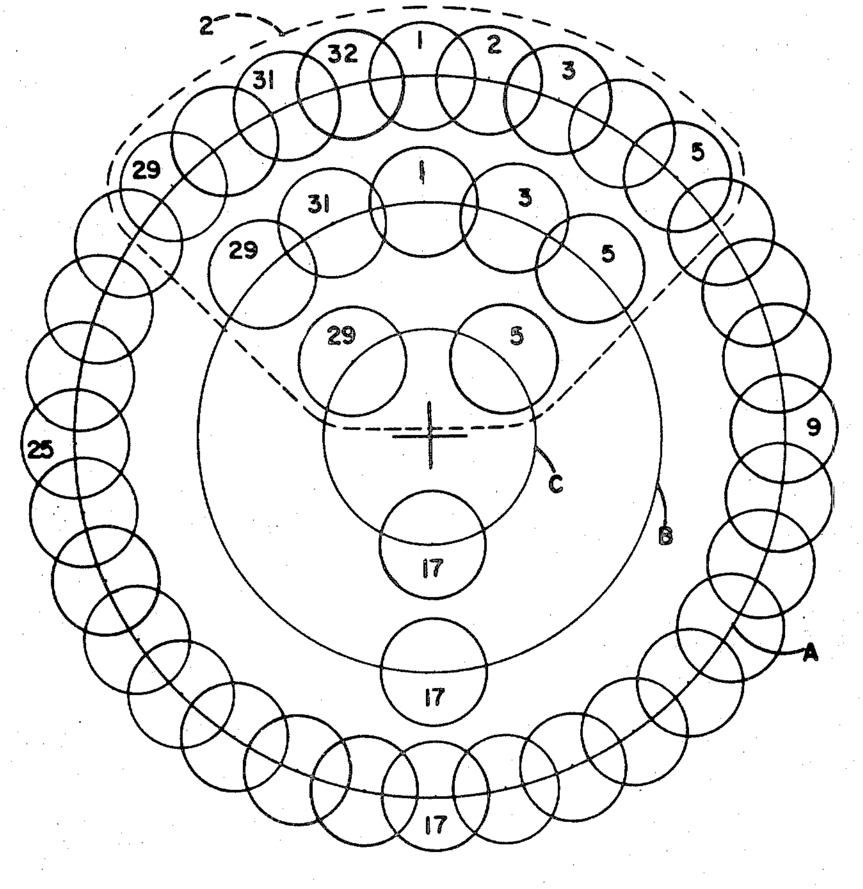
FIG. 2 is a diagram showing the present sampling technique.

Referring now to FIG. 2, at each position, beam 21 undergoes the second, or polar, scanning mode. The beam spot is made to scan a small circular area of the fingerprint along a plurality of concentric circles. According to a preferred embodiment of the invention, the beam spot is made to scan along three concentric circular paths labeled A, B and C, in that sequence. During each polar scan, the circular area of the fingerprint is observed, a small portion at a time, these small portions being denoted 1 through 32, for example, in FIG. 2. The light reflected by fingerprint 10 may be focused by a lens 23 onto a photomultiplier tube 24 which provides, on a line 25, an electrical analog signal indicative of the pattern contained on fingerprint card 10 within the small circular area. The analog signal on line 25 is applied simultaneously to a quantizer 30 and a contrast control circuit 31. In one embodiment, quantizer 30 is operative to compare the analog signal on line 25 with a given threshold value and to produce a binary 1 if the analog signal level is above the threshold value and a binary 0 if the analog signal level is below the threshold value. However, this is by no means a requirement of the present invention. It will be apparent to those skilled in the art that several threshold levels may be used and the analog signal at each of positions 1 through 32 converted into a digital signal having two or more bits. But for reasons of simplicity, the present invention will be described with quantizer 30 having a single fixed threshold level. In other words the quantizer is a fixed signal level detector. If the signal generated by photomultiplier tube 24 is below a fixed voltage level, the quantizer generates a false output pulse. If the signal generated by photomultiplier tube 24 is above the fixed voltage level, a true output pulse is generated.

Contrast control 31 is operative to adjust the level of the threshold value or values in quantizer 30 as a function of the local quality of the fingerprint. In the embodiment using a fixed level detector as the quantizer 30, the contrast control 31 is not required. The resultant digital signal is applied to temporary memory 4 which includes a plurality of synchronized, circulating shift registers 40, 41 and 42, one for each of the scanning orbits, under the control of a gate control circuit 43 which is operative to alternately and sequentially close switches 44, 45 and 46 between the output of quantizer 30 and the inputs of shift registers 40, 41 and 42, respectively. A direct and simple synchronism of each of registers 40, 41 and 42 may be established by matching the period of each of orbits A, B and C with the circulating period of the registers.

In general, each of registers 40, 41 and 42 has n stages where $n$ is equal to the number of small portions observed in each of orbits A, B and C. In the present example, since each orbital scan is divided into 32 separate positions, each of registers 40–42 has 32 storage elements and is capable of storing 32 samples corresponding to the 32 individual positions on each orbital scan. In the event that the output of quantizer 30 is a two or more bit digital signal, registers 40–42 would each have a corresponding number of parallel channels.

After 96 samples have been loaded into registers 40, 41 and 42, the bit pattern continues to circulate through the registers. This has the effect of rotating the fingerprint pattern with respect to decision logic 5 which is interconnected with registers 40, 41 and 42 in a manner which will become clearer hereinafter. As the pattern circulates once, 32 binary decisions (yes/no) are made. A yes decision causes the contents of output register 6 to read out both the X and Y coordinates of the scan point as well as the angular orientation of the detected minutiae. Upon completion of the decision cycle, the encoded output is made available for transmission if recognition occurs.

The present fingerprint minutiae reading device is capable of locating and identifying any specified type of minutia such as ridge endings, bifurcations and the like. It is also capable of the simultaneous detection of any number of types of minutiae or any combination thereof. However, for purposes of explanation only, the detection of ridge endings will be described herein, and the manner of extending the system to other types of minutiae will be discussed later.

Figure 3:
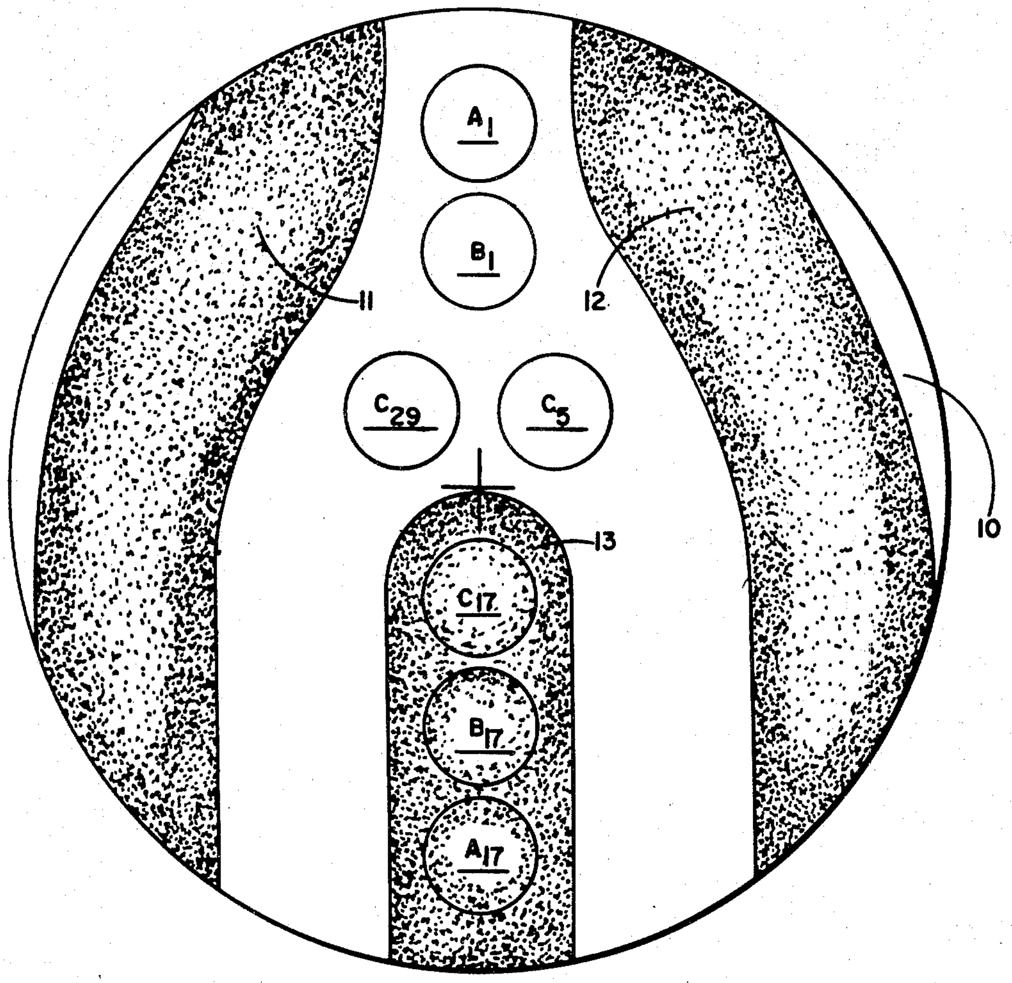
FIG. 3 is an exploded view of a portion of a fingerprint showing its relationship to the present scan pattern.
Figure 4:
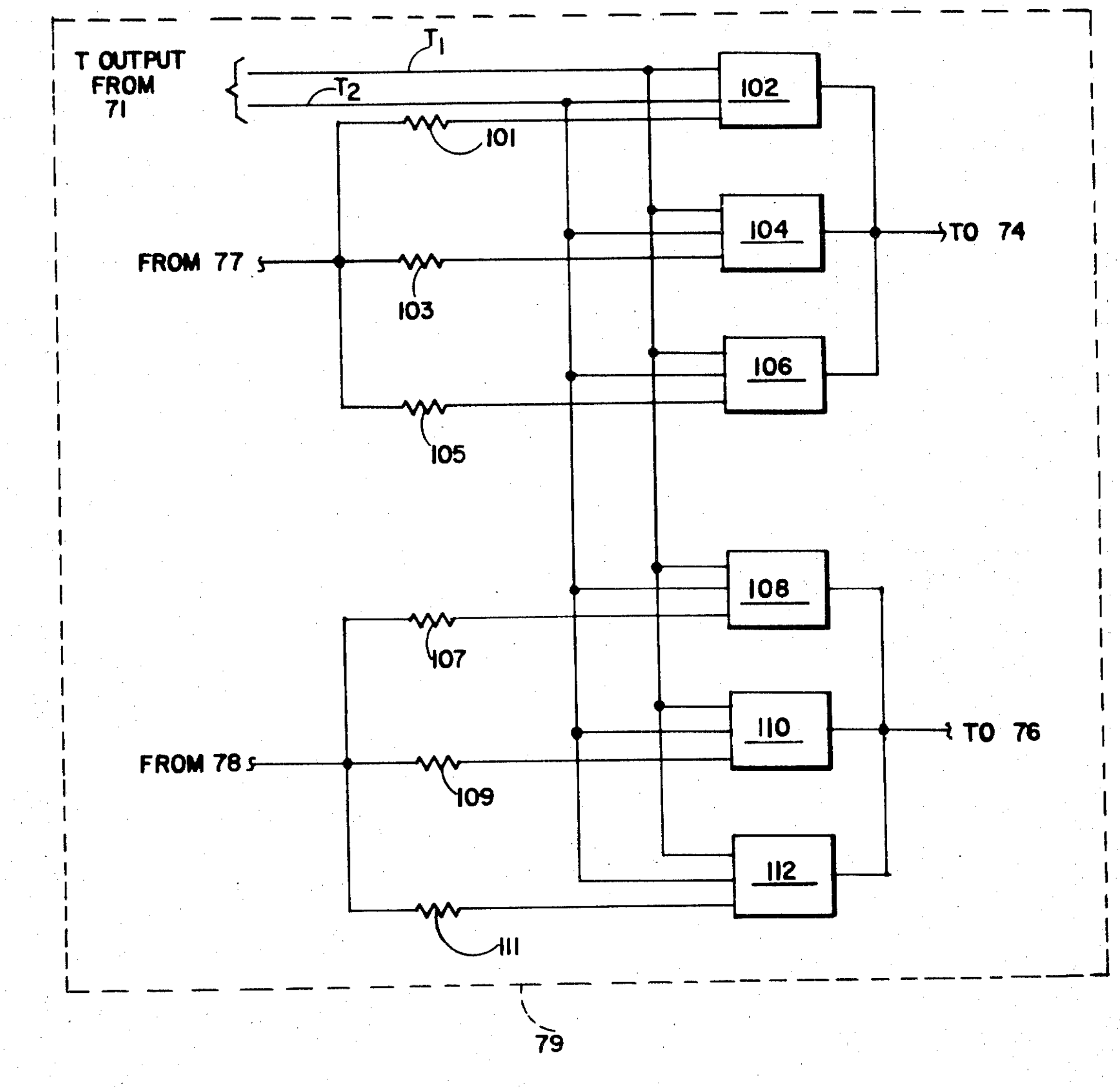
FIG. 4 is a schematic representation of an exemplary circuit schematic of the radii control components.

Referring now to FIG. 3, there is shown an enlarged portion of a fingerprint 10 containing first and second continuous lines 11 and 12, corresponding to fingerprint ridges, and a line 13 corresponding to a ridge ending. The scale shown in FIG. 3 is the same as that shown in FIG. 2 and shows the area which would be encompassed within a polar scan of flying spot scanner 20. According to the present invention, such a ridge ending may be detected by noting that for such a minutia, certain predeterminable conditions exist. For example, as shown in FIG. 3, a ridge ending is characterized in that flying spot scanner 20 will encounter a nearly white area at the first position in orbit A, the first position in orbit B and the fifth and twenty-ninth positions in orbit C. Similarly, a ridge ending is characterized in that flying spot scanner 20 will encounter a dark area at the seventeenth position in each of orbits A, B and C. In addition, even though ridge ending 13 may have any angular orientation through 360°, the relative positions of the significant scan locations remains the same.

The present invention utilizes these relationships to locate specified minutiae such as a ridge ending as shown in FIG. 3. To this end, the digital value of the fingerprint pattern at each of the 32 scan points in orbit A is loaded into shift register 40 by closure of switch 44. The data in register 40 then continues to circulate while the digital value of the fingerprint patterns at each of the 32 scan points in orbit B is loaded into register 41 by closure of switch 45. The data in registers 40 and 41 continues to circulate while the digital value of the fingerprint pattern at each of the 32 scan points in orbit C is loaded into shift register 42 by closure of switch 46. After all 96 samples have been loaded into registers 40–42, the bit pattern in each continues to circulate. This rotation has the effect of rotating the pattern shown in FIG. 3 through 360°. Recognition of the presence of a minutia is achieved by the use of decision logic 5 which receives as inputs the states of selected stages in each of shift registers 40, 41 and 42. In other words, in the case of a ridge ending as shown in FIG. 3, decision logic 5 would receive two inputs from register 40 representing the first and seventeenth stages, two inputs from register 41 representing the first and seventeenth stages and three inputs from register 42 representing the fifth, seventeenth and twenty-ninth stages. Decision logic 5 is operative to sense the simultaneous occurrence of the required states of these stages. However, as pointed out above, it is not necessary that the ridge ending have the orientation shown in FIG. 3, since the constant circulation of the bit pattern contained in registers 40, 41 and 42 has the effect of continuously rotating the fingerprint pattern with respect to the fixed decision logic inputs.

According to the present invention, a minutia is detected only when its position (the center of the ridge ending) is within a predetermined distance from the center of the tri-orbital scan, this distance being a function of the spot diameter and the diameters of orbits A, B and C. If a ridge ending is within the area covered by a tri-orbital, polar scan, but its position is outside of the predetermined distance, no recognition is made. However, this minutia will be detected at a subsequent time when its center is within the prescribed limit.

When decision logic 5 detects the presence of a minutia, a signal is applied to output register 6 which is caused to read out the X and Y location of the scan point, together with the angular orientation of the minutia.

It will now be apparent to those skilled in the art that the present apparatus may be used to detect any type of minutia and to simultaneously detect any number or combination of minutiae. In other words, in order to detect any other type of minutia, the shape thereof must first be ascertained so that the conditions which characterize it may be determined. Once this is done, it is a simple matter to select those stages of registers 40–42 whose combined states will signal the presence of the minutia. Additional decision logic circuits may be used, one for each minutia to be located, to sense the states of these selected stages in registers 40–42 and to signal the presence of a minutia. The outputs of all of the decision logic circuits, which may, most simply, consist of AND and NAND gates, may be connected to a single OR gate whose output is applied to output register 6.

Referring again to FIG. 1, according to one embodiment of the invention, the scan pattern is controlled by both digital and analog signal generators which are synchronized by a clock 70. Digital techniques are provided to produce the signals which determine the coordinates X, Y of the scan point. Analog circuitry produces two sinusoidal signals $x$, $y$ which are equal in frequency and amplitude but have a 90° phase difference, which are used to perturb the deflection of the electron beam in flying spot scanner 20 around the scan point. The amplitude of the sinusoidal signals may have three discrete values to define the radii of orbits A, B and C.

Sequencing of the entire operation is controlled by a scan event generator 71 which is controlled by clock 70 via a counter 72. Scan event generator 71 is operative to produce a signal $I_x$ which is applied to an X counter 73 which may be capable of counting, for example, up to 600 and whose output is applied via a summing amplifier 74 to the horizontal input of flying spot scanner 20 to control the X coordinate of the scan point. $I_x$ is a digital signal which increments the count of X counter 73. When the count in X counter 73 reaches 600+1, X counter 73 is re-set to zero and a signal $I_y$ is applied to a Y counter 75 which is caused to advance one count. Y counter 75 may be capable of counting, for example, up to 500. The output of Y counter 75 is applied via a summing amplifier 76 to the vertical control input of flying spot scanner 20 to control the Y coordinate of the scan point. When Y counter 75 reaches a count of 500+1, it, along with X counter 73, is re-set to zero. The values of X and Y contained in counters 73 and 75, respectively, are provided to an X register 60 and a Y register 61, respectively, in output register 6 so that the instantaneous value of the count contained in counters 73 and 75 is always available.

The T signal controls the position of switches 44 through 46 as well as the scanning radius for the flying spot scanner 20. The $I_x$ signal controls the linear position of the flying spot scanner after the ABC polar scans. In its simplest embodiment, the scanning generator 71 may be implemented by decode logic such as AND gates. In that case, the counter states of counter 72 are decoded into signals T and $I_x$. For example, at count one, a first T signal is decoded for closing switch 44 which may, for example, be a field effect transistor. The switch remains closed through a count of 32. At the end of the first 32 counts, the T signal applied to switch 44 is disconnected and a second T signal is generated from the decoded count 33 or the new count one,for closing switch 45. Simultaneously, the second T signal provides an input to radii control 79 for reducing the scanning radius of the flying spot scanner 20. Following the next count of 32, a third T signal is generated for closing switch 46 and for further reducing the radius of the flying spot scanner. At the end of three counts of 32, a new $I_x$ signal is generated for incrementing counter 73. Obviously, therefore, simple AND gate logic can be used to implement a scan event generator within the scope of the invention.

Basically, a system is disclosed, including scanner 20 which is moved to an XY coordinate position by the horizontal and vertical amplifiers 76 and 74. The amplifiers are controlled by XY counters 73 and 75. After the scanner has been positioned at an XY coordinate, the count of counter 72 is decoded, as a T signal, for establishing the radius of a first polar scan A. Simultaneously, switch 44 is closed so that the variations in light detected by the photomultiplier 24, converted into digital pulses, are stored in register 40. Register 40 is a recirculating shift register.

After the A scan has been completed, a second T signal reduces the radius for the B scan, opens switch 44, closes switch 45 for enabling digital pulses representing each point of the B scan to be stored in register 41. The process is repeated for the C scan.

At the end of the three scans at the XY coordinate position, the count of counter 72 is again decoded for initiating a new $I_x$ signal for moving the scanner to a subsequent XY coordinate where the process is repeated. The process is continued until a certain relationship or pattern is detected between the digital signals stored in the three registers 40 through 42.

As the digital signals are compared in decision logic 5, counter 72 provides an input to $\theta$ register 62 so that when a predetermined relationship is detected, the angular position of that detected relationship relative to a normal axis is known. For example, if a predetermined relationship is detected at a count of 10, the count of 10 could indicate an angular orientation of approximately 60° relative to an X axis.

According to a preferred embodiment of the present invention, clock 70 may operate at a frequency of 2.0 MHz. The output G of clock 70 is applied to counter 72 which is operative to count the pulses from clock 70 and to provide a first output square wave at 62.5 kHz (1/32nd of 2.0 MHz). This signal is used to establish the time for one orbital scan and is applied, with a 90° phase difference, to a pair of tuned circuits 77 and 78, which pass only the fundamental components of the two 62.5 kHz square waves. The two sinusoidal output signals from tuned circuits 77 and 78 have the same frequency and amplitude but differ in phase by 90°. The outputs of tuned circuits 77 and 78 are applied to a radii control circuit 79 which is operative, under the control of a signal T from scan event generator 71, to adjust the amplitudes of the sine waves through three steps which are appropriate to generate the orbits A, B and C shown in FIG. 2. The outputs of radii control circuit 79 are applied to summing amplifiers 74 and 76 where they are summed with the signals from counters 73 and 75, respectively, and applied therewith to the horizontal and vertical inputs, respectively, of flying spot scanner 20.

The 62.5 kHz signal from counter 72 and the clock signal G are applied to scan event generator 71 for synchronization thereof. In the absence of any additional apparatus, scan event generator 71 is operative, after four complete cycles of the 62.5 kHz square wave, representing four complete scan cycles, to generate the signal $I_x$ to increment X counter 73. The first three scan cycles are used to scan orbits A, B and C whereas the fourth scan cycle is used to permit the bit pattern contained in registers 40–42 to circulate once. At the end of this period, X counter 73 is incremented and the scan pattern repeats at the new location.

A refinement of the basic scan pattern is desirable to allow for variations in the quality and position of fingerprints on fingerprint card 10. In general, at each scan point, a preliminary scan of the fingerprint can be made to calibrate the system automatically. A contrast control circuit 31, which is connected via line 25 to the output of photomultiplier tube 24, can measure the local variations of the reflected light intensity along outer orbit A. The result of this binary scan establishes the local range of intensity which can be used to define the threshold within quantizer 30. Furthermore, if no variations in light intensity are sensed, which may occur in the event of blanks or ink blots, this will indicate that there is no local detail worth scanning so the scan program can be advanced to prevent a waste of time by sampling further around that scan point.

More specifically, the local variations in intensity of an image are expected to range from zero for blanks or ink blots to a maximum defined by bright illumination of an exceptionally clear fingerprint. For this purpose, quantizer 30 may contain a comparator (not shown) which operates by making a comparison of the analog signal contained on line 25 with a threshold value. However, the operation of the system will be erratic unless automatic contrast control is employed to normalize the range of variations. Therefore, contrast control 31 may include a peak-to-peak detector (not shown) which measures the maximum variation sensed while scanning the outer orbit A during a preliminary scan cycle. The preliminary scan cycle may be achieved during the time period that the information is being circulated in registers 40–42 to make a determination as to the presence of a minutia. In other words, after counter 72 signals the scan of orbit C at a specified location, scan event generator 71 may operate to generate the signal $I_x$ to increment X counter 73 and the signal P to contrast control circuit 31 so that a scan of orbit A at the next location may be made during the time that decision logic 5 is determining the presence or absence of a minutia at the previous scan location. If the output of the peak detector exceeds a given threshold, a binary signal S may be sent to scan event generator 71 to indicate the presence of local detail and to permit the complete 3 orbit scan of that location. In this case, the measured peak variation D is applied to quantizer 30 to adjust the level of the threshold so that the samples obtained on the A, B and C scan cycles can be quantized properly.

In the event that the peak-to-peak detector within contrast control 31 indicates the lack of significant local detail at the next scan point, a signal R is generated by scan event generator 71 which may be used to re-set contrast control 31. Simultaneously, the signal $I_x$ is generated to cause X counter 73 to increment to the next scan location. This procedure will then continue with only the outer orbit A being scanned at each location until contrast control 31 indicates the presence of local detail.

In summary, after the circuit is initialized, scan event generator 71 will establish orbit A and a preliminary scan thereof will be made. In the event that contrast control 31 does not sense intensity variations during such scan, a signal S will be applied to scan event generator 71 which first generates the signal R to re-set contrast control 31, then generates the signal $I_x$ to increment X counter 73 and then generates the signal P to cause contrast control 31 to make a preliminary scan of orbit A at the next location. This procedure continues until contrast control 31 senses an intensity variation at the new location. In this event, signal D establishes the threshold level in quantizer 30 and each of orbits A, B and C are scanned with the resultant signals being fed into registers 40, 41 and 42, respectively. At the end of the scan of orbit C, scan event generator 71 generates the signal $I_x$ to increment X counter 73 so that during the next scan cycle a preliminary scan of orbit A at the next scan location can be made. Simultaneously, the bit pattern stored in registers 40–42 is circulated for one scan cycle to permit decision logic 5 to determine the presence or absence of a minutia. In the absence of a sensed minutiae, no signal is generated by decision logic 5 and the scanning procedure continues as above. On the other hand, if decision logic 5 senses the presence of a minutia, a signal is generated to output register 6 which provides an output indicative of the position and angular orientation of the sensed minutia.

Circulating shift registers 40–42 provide, under control of clock 70, temporary storage for a digital representation of the local details in the neighborhood of a scan point. Registers 40–42 may consist of 96 flip-flops organized into three 32 bit registers. Each register is used to circulate the 32 bit samples which are collected along each of the three orbital scans A, B and C. Each register shifts once per clock cycle. It takes 32 clock cycles (one scan cycle) to circulate any pattern through a register. The loading of the registers is controlled by the signal T generated by scan event generator 71 in response to one complete cycle of the 62.5 kHz square wave from counter 72. In other words, during a first scan cycle, gate control 43, in response to signal T, operates to close switch 44 and radii control 79 operates to adjust the outputs of circuits 77 and 78 to generate orbit A. The sequence of bit samples from quantizer 30 is gated into register 44 during the scan of orbit A. At the end of one scan cycle, scan event generator 71 generates signal T to cause gate control 43 to open switch 44 and close switch 45 as well as adjusting radii control circuit 79 to generate orbit B. During orbit B, the sequence of bit samples from quantizer 30 is gated into register 41. Finally, at the end of one scan cycle, scan event generator 71 generates signal T to cause gate control 43 to open switch 45 and close switch 46 and radii control 79 to adjust the amplitude of the signals from circuits 77 and 78 to generate orbit C. During orbit C, the sequence of bit samples from quantizer 30 are applied to register 42. It should be noted that registers 40–42 circulate continuously under control of signal G from clock 70. The gating signal T enables quantizer 30 to write into the proper register at the proper time while maintaining the synchronism of the bit pattern.

The bit pattern which is loaded into registers 40–42 represents the pattern variations in the neighborhood around a scan point. This coded representation can be rotated in 32 discrete steps with respect to the registers. The 96 flip-flops in registers 40–42 can be tapped to permit any arbitrary wiring network to be formed between the flip-flops and decision logic 5.

When a tri-orbital scan is completed, the digital value of the scanned portion of the fingerprint has been loaded into a temporary memory and is being rotated because of the circulation of the information bits in the three circulating registers. The detection of specified minutiae is accomplished by observing the states of several selected flip-flops in the three circulating registers. As explained above, this may be accomplished by connecting the output of the selected flip-flops to the input of decision logic 5 which operates to detect the presence of a specified condition, such as that shown in FIG. 3. Upon the detection of such a condition, decision logic 5 provides a signal to output register 6 which consists of X register 60, Y register 61 and a $\theta$ register 62. As explained previously, X register 60 and Y register 61 receive as inputs the signals from X counter 73 and Y counter 75, respectively, to constantly provide an indication of the X and Y coordinates of the scan point. $\theta$ register 62 receives a signal from counter 72 indicative of the instantaneous count therein so as to constantly contain an indication of one of 32 possible orientations as the scan pattern is circulated. $\theta$ register 62 normally copies the contents of counter 72 unless a recognition decision inhibits further change thereof. If a recognition decision is made, the availability of output data is signalled by decision logic 5 and the data is transmitted out of output register 6.

A further modification of the present system may be made to inhibit the detection of false ridge endings at the boundaries of fingerprint impressions. Referring again to FIG. 2, a group of 26 samples from a sector encompassed by a dotted line 2 may be used for this determination. When all these samples are in the state of nearly white, this indicates the presence of the boundary condition rather than a legitimate ridge ending and the detection of a ridge ending should be inhibited. The same approach can be used to inhibit the detection of false ridge endings produced by scars, warts, or other ridge obliterating defects. For this purpose, a logic circuit (not shown) may be interconnected with the flip-flops in registers 40, 41 and 42 so as to detect the simultaneous presence of a nearly white signal in each of the locations within dotted line 2 in FIG. 2. When this occurs, a signal may be provided to scan event generator 71 to inhibit a false reading and to cause X counter 73 to be re-set to zero to start the scan of the next line.

While the invention has been described with respect to a preferred physical embodiment constructed in accordance therewith, it will be apparent to those skilled in the art that various modifications and improvements may be made without departing from the scope and spirit of the invention. For example, although the present invention has been described with respect to a system for detecting specified minutiae in a fingerprint, it will be obvious to those skilled in the art that the present invention is broadly applicable to the field of pattern recognition. Accordingly, it is to be understood that the invention is not to be limited by the specific illustrative embodiment, but only by the scope of the appended claims.

Referring to FIGS. 1, 2, 4 and 5, a truth table may be established showing the relationship of the orbits shown in FIG. 2 with respect to the component portions $T_1$ and $T_2$ of the signal T, as follows:

TRUTH TABLE

| T VALUES $T_1$ | $T_2$ | IN TERMS OF FIGURE 2 |
|---|---|---|
| 0 | 0 | AT ORIGIN |
| 0 | 1 | A ORBIT |
| 1 | 1 | B ORBIT |
| 1 | 0 | C ORBIT |

Figure 5:
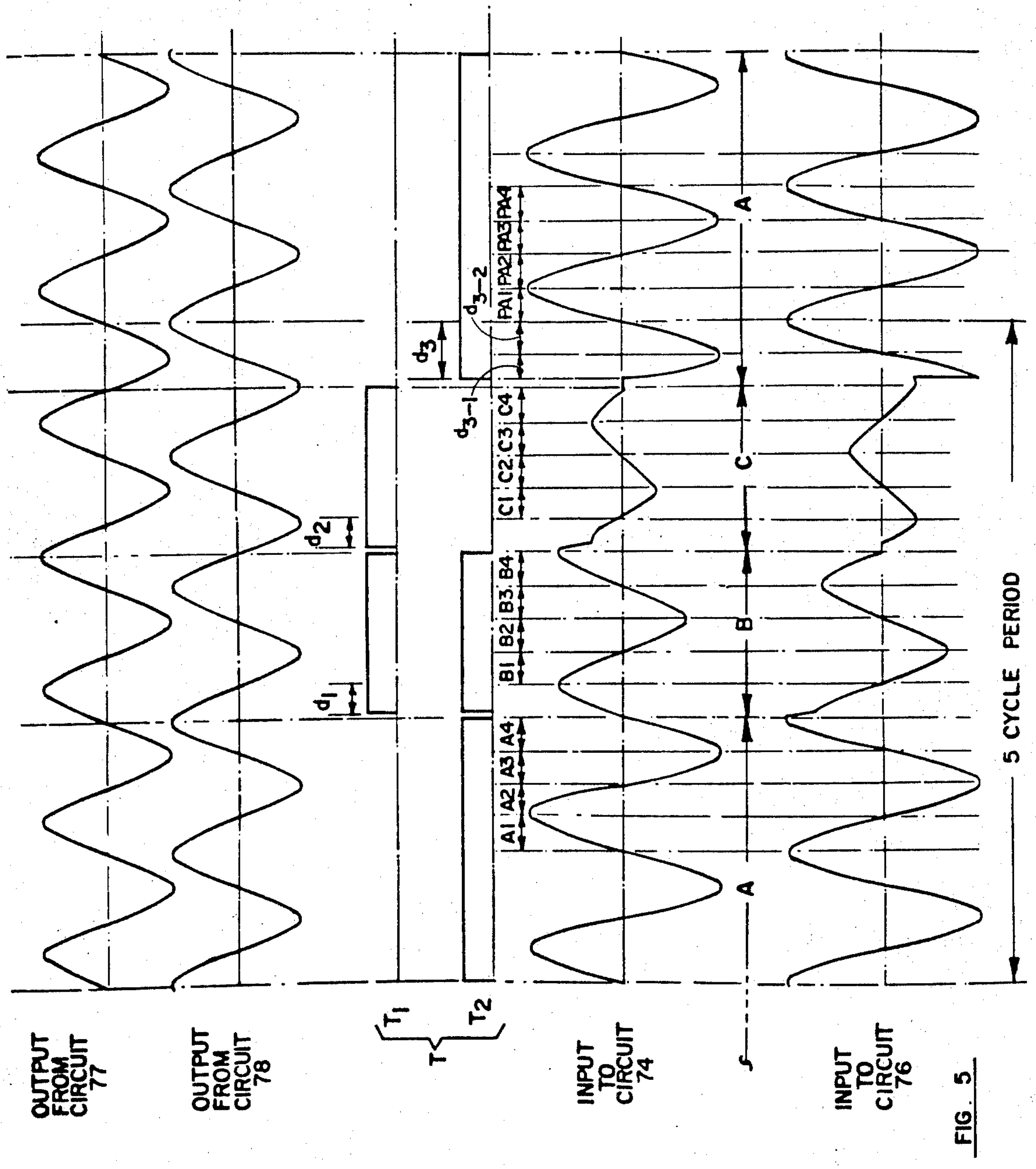
FIG. 5 is a waveform diagram showing output waveforms from tuned circuits, input waveform, the timing pulses for the selected orbits, and exemplary waveforms provided for the several orbits which are provided as inputs to the horizontal and vertical amplifiers.

Hence $T_1$ and $T_2$ control the timing with respect to responsivity to tuned circuit 77 shown as a sine function in FIG. 5, and also controls the timing with respect to responsivity to tuned circuit 78, shown as a cosine function in FIG. 5 or displaced in phase with respect to the sine function by 90°.

Operatively, the output of circuit 77 is controlled by $T_1$ and $T_2$, thereby selecting the time period when translator switches 102, 104, and 106 are either opened or closed. Resistors 101, 103 and 105 provide the attenuation necessary to provide output signals from circuit 77 for either orbits A, B or C, or if pulses $T_1$ and $T_2$ are both absent (zero) to maintain the scan action at the origin, as compared to some discrete orbit circumferential to the origin. Likewise, the output circuit 78 is controlled by $T_1$ and $T_2$, thereby selecting the time period when transistor switches 108, 110 and 112 are either opened or closed. Resistors 107, 109 and 111, respectively providing attenuation levels necessary to provide output signals from circuit 78 for either orbits A, B or C or if pulses $T_1$ and $T_2$ are both absent (zero) to maintain scan action at the origin, as compared to some discrete orbit.

The outputs of radii control 79, as represented by waveforms identified as "input to 74" and "input to 76" show the amplitude of the waveforms for orbit positions A, B or C, identified in FIG. 5 along A, B and C, and responsive to signals coming from tuned circuits 77 and 78, whenever the output from tuned circuit 77 brings about the input to horizontal amplifier 74, and the output from tuned circuit 78 brings about the input to vertical amplifier 76.

The radii control circuitry 79, has inputs from timing signal components $T_1$ and T, inputs from tuned circuits 77 and 78, and outputs connected to horizontal amplifier 74 and vertical amplifier 76, the waveform hereof being shown in FIG. 5.

Therefore, $T_1$ signal is connected as an input to electronic switches 102, 104, 106, 108, 110 and 112. $T_2$ signal is connected as another input to these same electronic switches. This is necessary because $T_1$ is a timing signal having a binary state of 0 or 1 (absence or presence of the pulse) while $T_2$ also has the binary state of 0 or 1, the combinations of the binary states of $T_1$ and $T_2$ selecting the orbits A, B, or C or no orbit at all (when the binary states of $T_1$ and $T_2$ are both zero), according to the truth table, above.

Tuned circuit 77 is therefore connected to resistors 101, 102 and 103, the other ends of these resistors are respectively connected to inputs to switches 102, 104 and 106. The outputs of these switches are all connected to an input of the horizontal amplifier 74.

Similarly, tuned circuit 78 is connected to resistors 107, 109 and 111, the other ends of these resistors are respectively connected to inputs of switches 108, 110 and 112. The outputs of such switches are all connected to an input to the vertical amplifier 76.

In FIG. 5, for example, orbit A signal consists of two cyclic periods outputted from circuits 77 and 78. But inasmuch as $T_1$ logic state is zero (0) and $T_2$ logic state is one (1) the levels inputted to amplifiers 74 and 76 will have the highest amplitude since minimum attenation is provided by the logic in selecting the circuit having the lowest resistance values. As seen in the truth table the logic $T_1$=0, $T_2$=1 providing selection of the appropriate switches of the group 102, 104, 106, 108, 110 and 112, thereby switching radii control circuit action into orbit A. The switching during scan action from orbit A to orbit B will involve a delay time $d_1$ during which period the transient portion of the waveform (not shown) will decay resulting in the steady state inputs to amplifiers 74 and 76 consisting of 1.25 cycles of the scan period, and providing an amplitude of the input waveform, smaller in value to set the scan action into orbit B position, than that required with respect to orbit A position. This is achieved by the logic state for $T_1$ being one (1) and $T_2$ also being one (1) selecting the appropriate circuit portion to provide the attenuation required. The switching period during scan action from orbit B to orbit C position will involve a delay time $d_2$ similar to $d_1$ during which period the transient portion of the waveform switched will decay. The resulting amplitude of this signal for orbit C, smaller than amplitude required for orbit B, will during the next 1.25 cycles provide the attenuation required by the aforesaid switching, provide the lowest amplitude of input waveforms to amplifiers 74 and 76 to scan the innermost orbit shown in FIG. 2, except for orbital scan action at the origin, which is essentially the state prior to start of scan action for orbits A, B and C. The scan action is shown as repeating itself until proper pattern identification or rejection is made by cycling actions for orbits A, B & C. The period $d_3$ constitutes the period during which transient setting time occurs (decay of the transient portion), and it is during this period that a half cycle of the signal level that shifts the scan into orbit A from orbit C, is provided. The total scan action of one period therefore being 5 cycles in terms of output cycles of signals from circuits 77 and 78. This same period, $d_3$, is required to start the scan action, such starting period not being shown in FIG. 5. Subsequently, recycling occurs, as exemplified by the showing of repetition of the A orbital signal.

Hence, radii control circuit 79 is merely a attenuator actuated by pulses T comprised of components $T_1$ and $T_2$ from scan circuit generator 71, and sinusoidal signals from tuned circuits 77 and 78 that are attenuated in accordance with the orbit level signal desired which are determined by the binary logic relationships of $T_1$ and $T_2$, only four combinations of such binary logic outputs being possible, as shown in the truth table. The result is to provide accordingly attenuation of the signals from circuits 77 and 78 to the inputs of amplifiers 74 and 76, respectively.

Figure 6:
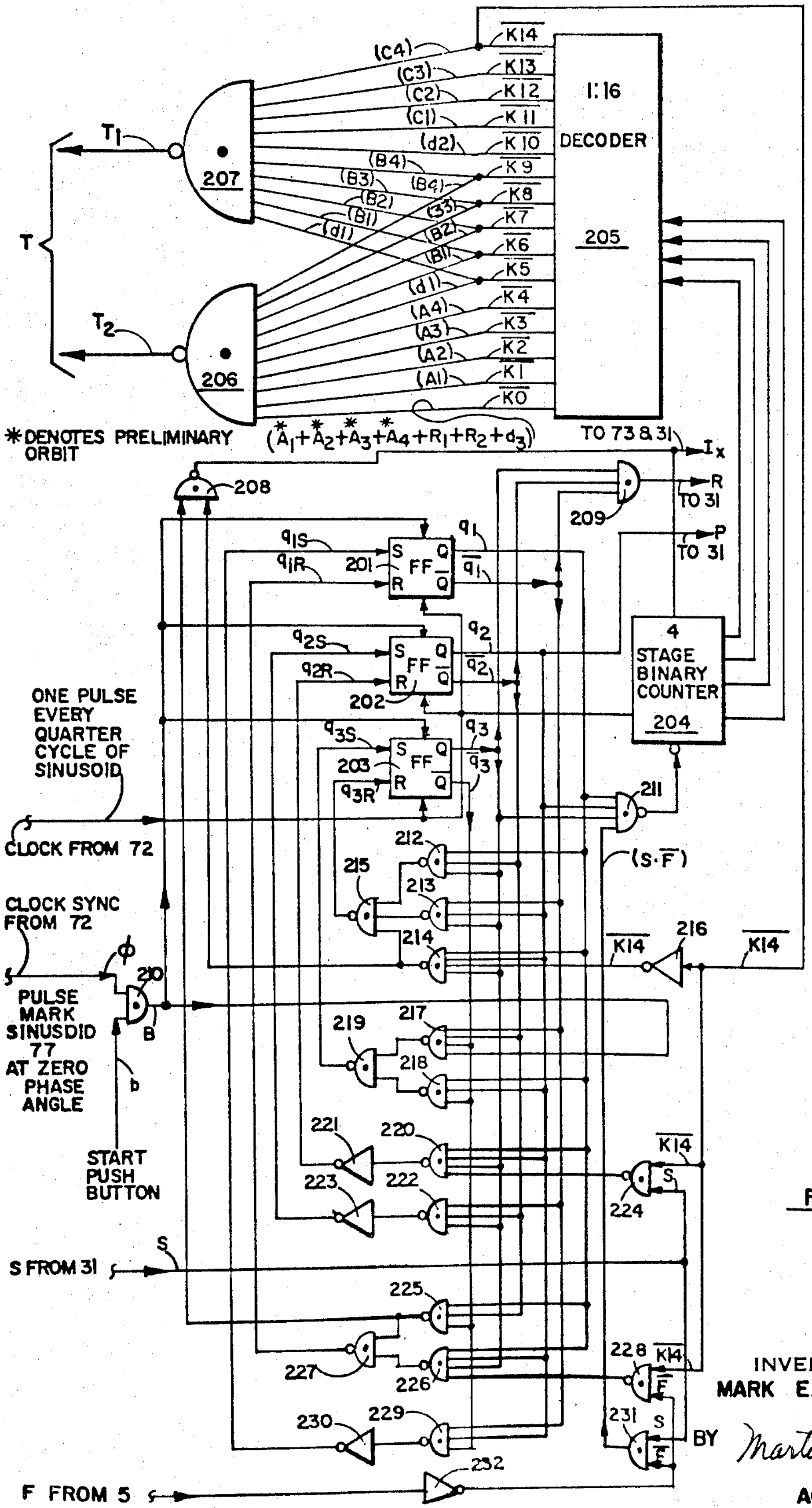
FIG. 6 is a schematic logic diagram of the circuitry for the Scan Event Generator.

Referring to FIGS. 1, 5, and 6 and tables 1, 2, and 3. Table 1 shows the sequence of states as a function of inputs and the corresponding outputs. Table 2 shows the interconnections and functional relationships of the components for scan event generator 71. Table 3 shows the logic outputs from decoder 205 in terms of functions executed by the Fingerprint Minutiae Reading Device and, in particular, as such outputted functions as are used to operate radii control 79, and shown in part in FIG. 5. The scan event generator 71, is the basic control unit for the Fingerprint Reader. It is a conventional sequential-switching-network implemented with integrated circuit flip-flops, 201, 202, 203, a four-stage binary counter, 204, and logic gates, 205 through 232.

Figure 7:
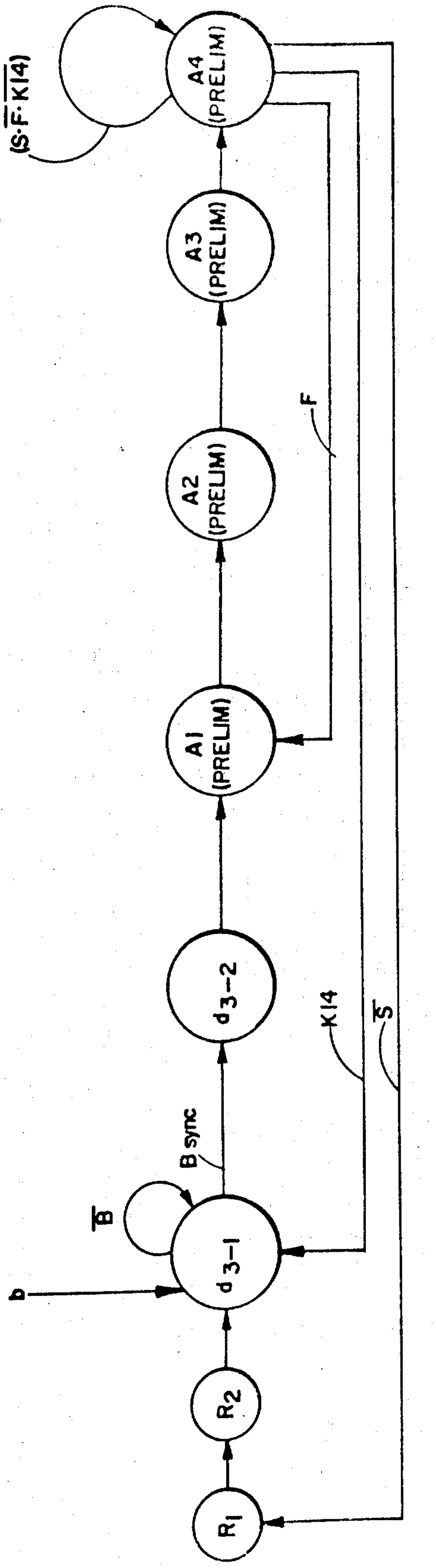
FIG. 7 is a state transition diagram of the orbital functions provided by the scan event generator.

Referring to FIGS. 5, 6 and 7 and Table 1, the scanning operation of the scan event generator is represented by the state-transition-diagram. Eight internal states are created by the flip-flops. The counter adds 14 additional states providing for the loading of data during each three orbit scan. The logic gates define the sequence of states for the machine as a function of the inputs, signal S from 31, signal F from 5 and clock signals from 72. The outputs, Ix, R, P and T, are logical functions of internal state of the scan event generator and the inputs. A detailed mechanization of the logic is shown. A start push button *b*, and gate 210 provide means for synchronizing the scan event generator at the start of operations with the phases of the two sinusoids 77 and 78 shown in FIG. 5 generated from operation of counter 72. Logic Gates 212, 213, 214, 215 and 216 define the reset function for flip-flop 203. Logic Gates 217, 218, 219 and 210 define the set function for flip-flop 203. Similarly, gates 220, 221 and 224 define the reset-function for flip-flop 202 while gates 222 and 223 define the set function for flip-flop 202. Gates 225, 226, 227, 228 reset flip-flop 201, while gates 229 and 230 set flip-flop 201. Output, Ix, is generated by gate 208. Output, R, is generated by gate 209. Output, P, is identically equal to the output from flip-flop 202, and T1 and T2 are provided by gates 205, 206 and 207 which decode the state of the binary counter 204. TABLE 1

| Required Inputs & Signals | | | Internal State | | Outputs | | | | | Orbit Functions |
|---|---|---|---|---|---|---|---|---|---|---|
| F | S | B | $Q_n$ | $Q_{n+1}$ | $T_1$ | $T2$ | $R$ | P | $I_x$ | |
| *x* | *x* | *x* | $A_1$ | $A_2$ | 0 | 1 | 0 | 0 | 0 | ) |
| *x* | *x* | *x* | $A_2$ | $A_3$ | 0 | 1 | 0 | 0 | 0 | ) A - Orbit |
| *x* | *x* | *x* | $A_3$ | $A_4$ | | 1 | 0 | 0 | 0 | ) Data Load |
| *x* | *x* | *x* | $A_4$ | $d_1$ | 0 | 1 | 0 | 0 | 0 | ) |
| *x* | *x* | *x* | $d_1$ | $B_1$ | 1 | 1 | 0 | 0 | 0 | ) |
| *x* | *x* | *x* | $B_1$ | $B_2$ | 1 | 1 | 0 | 0 | 0 | ) |
| *x* | *x* | *x* | $B_2$ | $B_3$ | 1 | 1 | 0 | 0 | 0 | ) **B Orbit** |
| *x* | *x* | *x* | $B_3$ | $B_4$ | 1 | 1 | 0 | 0 | 0 | ) |
| *x* | *x* | *x* | $B_4$ | $d_2$ | 1 | 1 | 0 | 0 | 0 | ) |
| *x* | *x* | *x* | $d_2$ | $C_1$ | 1 | 0 | 0 | 0 | 0 | ) |
| *x* | *x* | *x* | $C_1$ | $C_2$ | 1 | 0 | 0 | 0 | 0 | ) |
| *x* | *x* | *x* | $C_2$ | $C_3$ | 1 | 0 | 0 | 0 | 0 | ) C Orbit |
| *x* | *x* | *x* | $C_3$ | $C_4$ | 1 | 0 | 0 | 0 | 0 | ) |
| *x* | *x* | *x* | $C_4$ | $d_{3-1}$ | 1 | 0 | 0 | 0 | 1 | ) |
| *x* | *x* | 0 | $d_{3-1}$ | $d_{3-1}$ | 0 | 1 | 0 | 0 | 0 | ) |
| *x* | *x* | 1 | $d_{3-1}$ | $d_{32}$ | 0 | 1 | 0 | 0 | 0 | ) |
| *x* | *x* | *x* | $d_{3-2}$ | $*A_1$ | 0 | 1 | 1 | 0 | 0 | ) |
| *x* | *x* | *x* | A1 | $*A_2$ | 0 | 1 | 0 | 1 | 0 | ) A-Orbit |
| *x* | *x* | *x* | $*A_2$ | $*A_3$ | 0 | 1 | 0 | 1 | 0 | ) Preliminary Scan |
| *x* | *x* | x | $*A_3$ | $*A_4$ | 0 | 1 | 0 | 1 | 0 | ) and Making |
| 0 | 0 | *x* | $*A_4$ | $R_1$ | 0 | 1 | 0 | 1 | 0 | ) Decisions by |
| 0 | 1 | *x* | $*A_4$ | $A_1$ | 0 | 1 | 0 | 1 | 0 | ) decision logic 5 |
| 1 | *x* | *x* | $*A_4$ | $*A_1$ | 0 | 1 | 0 | 1 | 0 | ) |
| *x* | *x* | *x* | $R_1$ | $R_2$ | 0 | 1 | 0 | 0 | 0 | ) |
| *x* | *x* | *x* | $R_2$ | $d_{3-1}$ | 0 | 1 | 0 | 0 | 1 | ) |

NOTE:"x" indicates that it does not matter whether the required inputs are 0 or 1.
*Preliminary scans of A portions $A_1$, $A_2$, $A_3$, and $A_4$.

TABLE 2 of Functional and Interconnection Relationships of Components of Scan Event Generator 71

| Component No. | Type of Component | Input Thereto | Output Therefrom |
|---|---|---|---|
| **201** | flip-flop | $q_{1S}$ output from inverter<br>$q_{1R}$ output from gate **227**, clock output from counter **72**, output B from gate **210** for clearing | $q_1$, $\bar{q}_1$ |
| **202** | flip-flop | $q_{2S}$ output from inverter **223**,<br>$q_{2R}$ output from inverter **221**, clock output from counter **72**, output B from gate **210** for clearing | $q_2$ (same as P, which is input of contrast control **31**), $\bar{q}_2$ |
| **203** | flip-flop | $q_{3S}$ output from gate **219**,<br>$q_{3R}$ output from gate **215**, clock output from counter **72**, output B from gate **210** for clearing | $q_3$, $\bar{q}_3$ |
| **204** | 4 stage binary counter | clock from **72**, count enable from **211**, clear count from **208** | 4 outputs to **205** |
| **205** | 1:16 decoder | 4 binary inputs from **204** | $\overline{K_o}$ to $\overline{K_{14}}$ |
| **206** | NAND gate | $\overline{K_o}$ to $\overline{K_9}$ | $T_2$ of T |
| **207** | NAND | $\overline{K_5}$ to $\overline{K_{14}}$ | $T_1$ of T |
| **208** | NAND gate | gate **225** output,<br>gate **214** output | $I_x$ input to contrast control **31**, clear count input to counter **204** |
| **209** | AND gate | $q_3$ of gate **203**,<br>$\bar{q}_2$ of gate **202**,<br>$\bar{q}_1$ of gate **201** | R input to contrast control **31** |
| **210** | AND gate | clock sync pulses from **72**,<br>from start push button | B |
| **211** | NAND gate | S. $\bar{F}$ from output of gate **231**,<br>$q_3$ of flip-flop **203**,<br>$q_2$ of flip-flop **202**,<br>$q_1$ of flip-flop **201** | count enable input of counter **204** |
| **212** | NAND gate | $q_1$ from flip-flop **201**<br>$\bar{q}_2$ from flip-flopf **202**<br>$\bar{q}_3$ from flip-flop **203** | input to gate **215** |
| **213** | NAND gate | $\bar{q}_1$ from flip-flop **201**<br>$q_2$ from flip-flop **202**<br>$q_3$ from flip-flop **203** | input to gate **215** |
| **214** | NAND gate | $q_1$ from flip-flop **201**,<br>$q_2$ from flip-flop **202**,<br>output $K_{14}$ from inverter **216**,<br>$q_3$ from flip-flop **203** | input to gate **215**, input to gate **208** |
| **215** | NAND gate | output from gate **212**,<br>output from gate **213**,<br>output from gate **214** | input $q_{3R}$ of flip-flop **203** |
| **216** | INVERTER | $\overline{K_{14}}$ output of decoder **205** | input ($K_{14}$) |
| **217** | NAND gate | $\bar{q}_1$ output of flip-flop **201**,<br>$\bar{q}_2$ output of flip-flop **202**,<br>$\bar{q}_3$ output of flip-flop **203**, output (B) of gate **210** | input to gate **219** |
| **218** | NAND gate | $q_1$ output of flip-flop **201**,<br>$q_2$ output of flip-flop **202**,<br>$\bar{q}_3$ output of flip-flop **203** | input to gate **219** |
| **219** | NAND gate | output from gate **217**,<br>output from gate **218** | input $q_{3S}$ to flip-flop **203** |
| **220** | NAND gate | $q_1$ output from flip-flop **201**,<br>$q_2$ output from flip-flop **202**,<br>$q_3$ output from flip-flop **203**, output from gate **224** | input to inverter **221** |
| **221** | INVERTER | output of gate **220** | $q_{2R}$ input of flip-flop **202** |
| **222** | NAND | $\bar{q}_1$ output from flip-flop **201**, | |

| | | | |
|---|---|---|---|
| | gate | $\overline{q}_2$ output from flip-flop 202, $q_3$ output from flip-flop 203 | |
| 223 | INVERTER | output of gate 222 | $q_{2S}$ input to flip-flop 202 |
| 224 | NAND gate | $\overline{K_{14}}$ output of decoder 205, S output from contrast control 31 | input gate 220 |
| 225 | NAND gate | $q_1$ output of flip-flop 201, $\overline{q}_2$ output of flip-flop 202, $\overline{q}_3$ output of flip-flop 203 | input to gate 221, input to gate 208 |
| 226 | NAND gate | $q_1$ output of flip-flop 201, $q_2$ output of flip-flop 202, $q_3$ output of flip-flop 203, output of gate 228 | input of gate 227 |
| 227 | NAND gate | output of gate 225, output of gate 226 | $q_{1R}$ input to flip-flop 201 |
| 228 | NAND gate | $\overline{K_{14}}$ output of decoder 205, F output of inverter 232 | input to gate 226 |
| 229 | NAND gate | $\overline{q}_1$ output of flip-flop 201, $q_2$ output of flip-flop 202, $\overline{q}_3$ output of flip-flop 203 | input of inverter 230 |
| 230 | INVERTER | output of gate 229 | $q_{1S}$ input to flip-flop 201 |
| 231 | AND gate | S output of contrast control 31, $\overline{F}$ output of inverter 232 | s. $\overline{F}$ input to gate 211 |
| 232 | INVERTER | output (F) from decision logic 5 | $\overline{F}$ input to gate 228, $\overline{F}$ input to gate 231 |

TABLE 3 - LOGIC OUTPUT STATES OF DECODER 205

| Logic Symbol $K_n$ | Function Performed As Related to FIG. 5 and Table 1 preliminary orbits of orbit portions $A_1$, $A_2$, $A_3$, $A_4$, and synchronization periods $R_1$ and $R_2$, and transition $d_3$ from C orbit to A orbit |
|---|---|
| $\overline{K_1}$ | $A_2$ |
| $\overline{K_2}$ | $A_2$ |
| $\overline{K_3}$ | $A_3$ |
| $\overline{K_4}$ | $A_4$ |
| $\overline{K_5}$ | $d_1$ |
| $\overline{K_6}$ | $B_1$ |
| $\overline{K_7}$ | $B_2$ |
| $\overline{K_8}$ | $B_3$ |
| $\overline{K_9}$ | $B_4$ |
| $\overline{K_{10}}$ | $d_2$ |
| $\overline{K_{11}}$ | $C_1$ |
| $\overline{K_{12}}$ | $C_2$ |
| $\overline{K_{13}}$ | $C_3$ |
| $\overline{K_{14}}$ | $C_4$ |

Referring to Tables,1, 3 and FIG. 5, it is noted that internal states $R_1$ and $R_2$ as shown in columns $Q_n$ which is an arbitrary time designated as $n$, and $Q_{n+1}$ which is one clock period later, are recovery states, during which states synchronization is maintained while resetting the machine following the special preliminary orbital scan for which no contrast was measured. This period of time $R_1$ allows syncronization during rapid recycling of the machine. $R_2$ is similar period serving the same purpose, $R_1$ provides the first ¼ cycle delay and $R_2$ provides the second ¼ cycle delay, thereby bringing the orbital scan back with phase syncronization.

The logic equational relationships resulting from the logic of the system and as related to scan event generator are:

ENABLE $$COUNT = S \cdot \overline{F}\, q_1 \cdot q_2 \cdot q_3$$

$$q_1 SET = \overline{q_1} \cdot q_2 \cdot \overline{q_3}$$

$$q_1\ RESET = [q_1 \cdot \overline{q_2} \cdot \overline{q_3}] + [q_1 \cdot q_2 \cdot q_3 \cdot (F + K_{14})]$$

$$q_2\ SET = \overline{q_1} \cdot \overline{q_2} \cdot q_3$$

$$q_2\ RESET = q_1 \cdot q_2 \cdot q_3 \cdot (\overline{S} + K_{14})$$

$$q_3\ SET = [\overline{q_1} \cdot \overline{q_2} \cdot \overline{q_3} \cdot B] + [q_1 \cdot q_2 \cdot \overline{q_3}]$$

$$q_3\ RESET = [q_1 \cdot \overline{q_2} \cdot q_3] + [\overline{q_1} \cdot q_2 \cdot q_3] + [q_1 \cdot q_2 \cdot q_3 \cdot (K_{14})]$$

$$B = b \cdot \phi$$

$$R = R_1 + R_2$$

$$P = q_2$$

$$I_x\ (RESET) = [q_1 \cdot q_2 \cdot q_3 \cdot (K_{14})] + [q_1 \cdot \overline{q}_2 \cdot \overline{q}_3]$$

$$T_1 = [B_1 \cdot B_2 \cdot B_3 \cdot B_4] + [C_1 \cdot C_2 \cdot C_3 \cdot C_4]$$

$$T_2 = K_0 + K_1 + K_2 + K_3 + K_4 + K_5 + K_6 + K_7 + K_8 + K_9 = [A_1 \cdot A_2 \cdot A_3 \cdot A_4] + [B_1 \cdot B_2 \cdot B_3 \cdot B_4]$$

Referring to FIGS. 5 and 7, it is the state transition diagram for changes between logic states as pictorially displayed. Therein, it is shown that delay time $d_3$ is broken up into two component portions $d_{3-1}$ and $d_{3-2}$. Upon manually operating push button b, the scan event generator 71 is forced to assume transition state for orbit portion $A_1$ by clearing the flip-flops 201, 202 and 203.

Synchronization period $R_1$ or ¼ cycle is followed by synchronization period $R_2$ of similar period. Then synchronization periods $d_{3-1}$ occur prior to operation of push button $b$. Upon operation of push button b, delay time $d_{3-2}$ occurs, obtaining at that time synchronization of B function. Subsequently the preliminary cycle of $A_1$ orbit portion occurs followed by preliminary $A_2$ orbit portion. This is followed by $A_3$ preliminary scan portion and then $A_4$ preliminary scan portion of the A orbit. At this time the 4-state counter is enabled and counts while function $S \cdot \overline{F} \cdot \overline{K_{14}}$ is TRUE. When the count is 14, $K_{14}$ is TRUE. and a transition from $A_4$ (preliminary) to $d_{3-1}$ occurs. A variation in the normal sequence described above occurs when no contrast, $\overline{S}$, is measured. A fast recycle of the machine is initiated to bypass the data loading sequence by a transition from $A_4$ (preliminary) to $R_1$. Another variation in the normal sequence occurs when a detection, F, is sensed. A pause is provided to unload data by a transition from $A_4$ (preliminary) to $A_1$ (preliminary).

Figure 8:
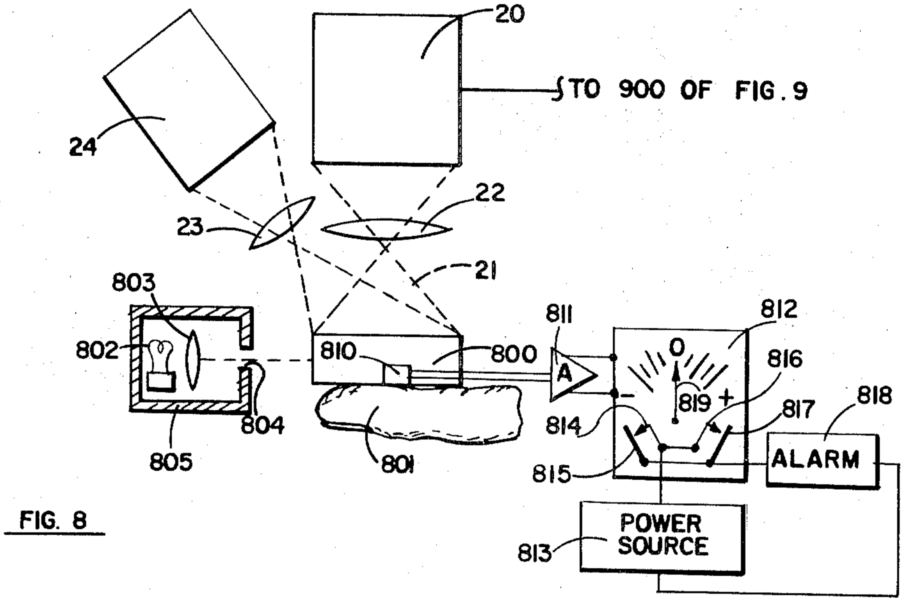
FIG. 8 shows a transparent member being edge-illuminated, the transparent member being for the purpose of applying a finger thereto so as to scan the fingerprint of that finger directly. The edge-illumination of this member or lens is used to provide diffusion of light reflected from the ridges of the fingerprint.

Referring to FIGS. 1 and 8, fingerprint card 10 may be replaced by an edge-lighted lens or member 800 upon which fingerprint of an actual finger 801 is imposed. Edge lighting is accomplished by means of a enclosed light source 802 focused through a lens 803 and exiting as a beam of light through a slit 804 of enclosure 805. Such light exiting from slot 804 will, edge-illuminate the lens 800. The subsystem shown in FIG. 8 is designed to generate an electronic image of the ridges of the fingerprint pattern without the use of an inked or photographed card having a fingerprint pattern thereon. The difficulty normally encountered in such an approach is lack of contrast, that is, difference in level of illumination - between ridges and valleys. This difficulty is overcome by using edge lighting of member 800 as the finger as is pressed against member 800. Light from light source 802 is allowed to pass through slit 804 at an edge of member 800, so that in the absence of the finger no light originating from source 802 is diffused by the virtue of the ridges and valleys to such diffused light reaches photomultiplier 24. When the finger is placed on the surface of member 800, the points of contact of the ridges interfere with the reflection of light rays at the boundary of ridges and valleys. Consequently the ridges of finger 801 are illuminated, and light is diffusedly-reflected therefrom through member 800 and through lens 23 into photomultiplier 24, as scanner 20 is simultaneously scanning the fingerprint pattern as described above. Member 800 may be flat, concave, convex or of other suitable shape such as cylindrical. Otherwise, the system may be set-up to operate as described with presence of fingerprint card 10, in connection with FIGS. 1–7. Member 800 may be made of glass, polystyrene, plexiglass, lucite or the like.

It is noted that flying spot scanner may have the scanning of the fingerprint card or fingerprint to provide information output from the X, Y and $\theta$ registers as described in connection with FIGS. 1-7, or may be used in conjunction with parts 800–805 as above described and the components shown in FIG. 9.

Figure 9:
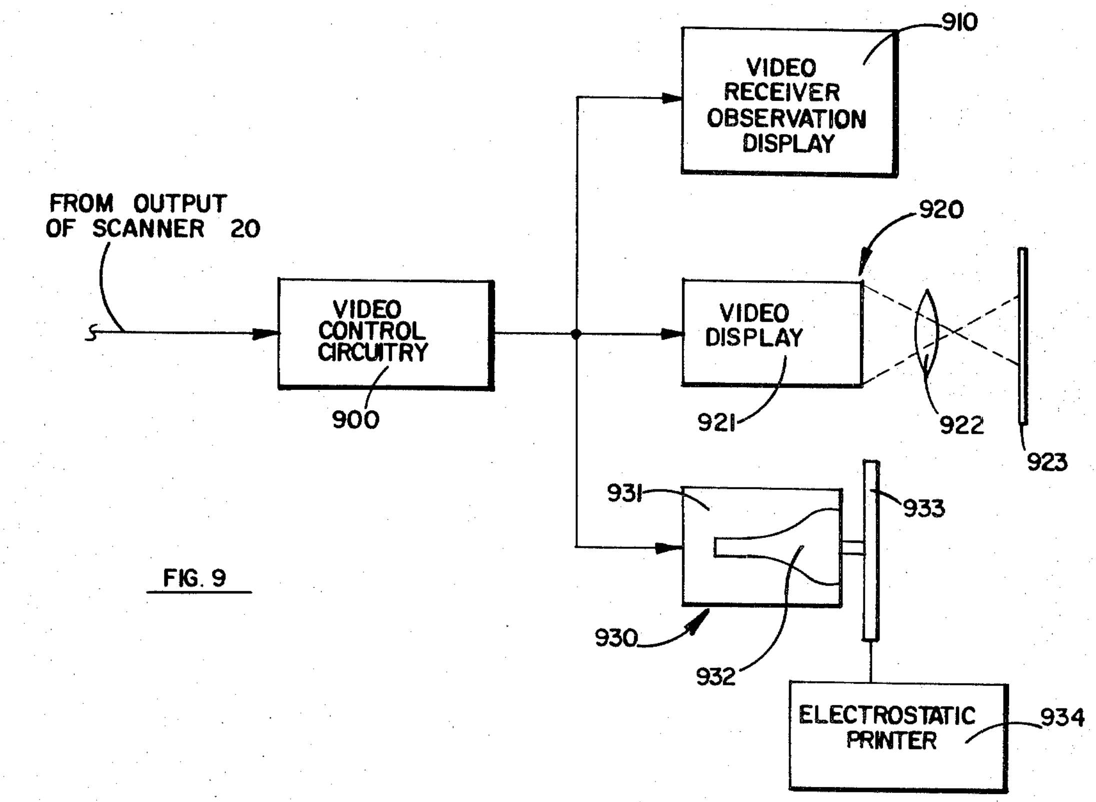
FIG. 9 is a video system connectable to the scanner for viewing and making cards having the fingerprint pattern thereon.

Referring to FIGS. 8 and 9, and utilizing scanner 20 with lens 22 and without the remaining circuitry of FIG. 1, and the components 800–805 as above described, the output of scanner 20 may be connected directly to conventional video processing circuitry 900 common to vidicon systems. Video circuitry 900 is cable-connected to video receiver display 900 for viewing the scanned fingerprint received and displayed thereon. Output of video circuitry 900 is also provided at 920, which comprises a photographic type video reviewing display 921 which may have focused through lens 922 the output image thereof for inpingement on a photographically emulsion-covered-fingerprint-record-card 922 so as to provide a card of similar form to fingerprint card 10 shown in FIG. 1. Output of video circuitry 900 is also provided at 930, which comprises video receiving display 931 containing a line-scan cathode ray tube 932 having a wired faceplate for deposition of electrostatic charges on a fingerprint card 933 which is followed by an electrostatic printer 934 of the Xerox or similar type for producing the fingerprint being scanned by scanner 20 on a card similar to that of card 10 as shown in FIG. 1.

Although not shown, it is obvious that switching may be provided to utilize the scanner 20 with either the subsystem as shown in FIGS. 8–9, or with the system described in FIGS. 1–7, above.

Referring again to FIG. 8, it may be seen that a sensor 810 such as a thermistor may be embedded in a portion of member 800 to provide contact with finger 801. Sensor 810 is connected to the input of amplifier 811 which output is connected to a meter relay 812 having end contact pairs 814–815 and 816–817. Contacts 814 and 816 are interconnected together and to one end of power source 813. Contacts 815 and 817 are interconnected together and to alarm 818. The return of alarm 818 is interconnected to the return side of power source 813. Contact pairs 814–815 and 816–817 are normally open, when meter 812 is unactuated, at which time movable pointer 819 is zero-centered. When a signal is provided by amplifier 811 to meter 812 upon sensing of the presence of finger 801 imposed on member 800 and hence on member 810, a voltage output is provided by sensor 810 to actuate amplifier 811 and meter 812, thereby causing pointer 819 to move to left or right, depending upon whether the temperature is below or above body temperature. Suitable resistance (not shown) may be provided in the output leads of amplifier 811, so that practically no current flows in the circuit of meter 812 because no input voltage to amplifier 811 is present. But when finger 801 is applied to member 800, a voltage is produced at output of sensor 810, amplified by differential amplifier 811 and applied to meter 812. The series resistors in the output leads of amplifier 811 may be adjusted in size (ohms) so that at body temperature meter 812 has its pointer 819 at zero, at below body temperature by say ½°, the pointer would move to the extreme left causing contacts 814 and 815 to cooperate and applying power to security alarm 818, or when body temperature is exceeded by a similar amount, the pointer 819 will move to the right and activate contact pair 816–817 thereby also causing alarm 818 to be operated. This arrangement can be used to prevent someone attempting to place an overlay of an authorized fingerprint over his own finger or fingers and thereby gain entrance, as in this instance the body temperature will drop due to the overlay, to below normal body temperature, to sound the alarm. Conversely, if someone is trying to prewarm the overlayed finger pattern, the temperature will rise above the upper tolerable limit, and will cause the meter pointer to sway to the right, to also sound the security alarm.

This device, preventative of breaking security by fingerprint substitution overlays together with the means for providing recognition of the characteristics of the fingerprint pattern, such as the minutiae irrespective of the angular orientation of the finger or pattern created thereby as described in connection with FIGS. 1–7, above, and by imposing same on member 800 makes a combination of security classification and/or identification that is virtually impossible of being overcome.

I claim:

1. Apparatus for determining the characteristics of a fingerprint pattern, comprising in combination:
 - first means with said fingerprint pattern imposable thereon, said fingerprint pattern constituting the ridges and valleys of a real finger, and means embodied in the first means for sensing the presence of the real finger so as to preclude substitution of simulated fingerprint overlay on the real finger;
 - a cathode ray spot scanner;
 - second means in optical relationship with respect to the first means for directing a light beam from the spot scanner on said first means and for scanning said first means and said pattern;
 - third means optically coupled to said second means for edge-illuminating said first means thereby causing illumination of said ridges and interference with diffused reflection of light therefrom thereby accentuating the ridges of the print from the finger by virtue of the edge illumination, and in the absence of said finger disabling any substantial amount of light originating from the third means causing said diffused reflection;
 - fourth means for receiving light in accordance with modulation of the light beam by said pattern;
 - means for sequentially positioning the beam of said cathode ray spot scanner at coordinate locations along rectilinear axes including means for sequentially scanning the pattern at each of the coordinate locations with a plurality of successive polar scans having polar radii of different magnitudes for scanning a plurality of portions of each of the coordinate locations;
 - means for generating digital signals at successive points of each of said plurality of successive polar scans, said digital signals indicating the contrast at each point of the polar scan pattern at each of the coordinate locations; and
 - means for registering the digital signals, generated by each of said plurality of polar scans, for transfer thereof externally to said apparatus.

2. The invention as stated in claim 1, including:

means for comparing the stored digital signals from each corresponding point of the polar scans for detecting predetermined relationships between the digital signals including means for indicating the detection of said predetermined relationship.

3. The invention as stated in claim 1, including:

counter means for passing sequentially through a plurality of counts in synchronization with the comparison of said digital signals; and means responsive to the detection of a predetermined relationship between the positions of said polar scans and the count of said counter means for indicating the angular orientation of detected pattern relative to a predetermined axis.

4. The invention as stated in claim 1, wherein:

said plurality of polar scans comprise three concentric polar scans and said means for storing comprises three shift registers including means for shifting the contents of the registers into the storing means for comparison.

5. The invention as stated in claim 4, including:

means responsive to the count of said counter means for sequentially connecting the registers to the means for generating whereby digital signals for each polar scan can be stored, and means simultaneously responsive to said count for controlling the radius of said polar scan including means for decreasing the radius of the scan after each scan until three polar scans have been completed; and means responsive to the count in said counter means for moving said scanner to a subsequent coordinate point after the polar scans have been completed.

6. The invention as stated in 1, including:

fifth means electrically coupled to the cathode ray spot scanner for providing video control of the received fingerprint pattern; and sixth means connected to the fifth means for displaying the received fingerprint pattern.

7. Apparatus for determining the characteristics of a fingerprint pattern, comprising in combination first means with said fingerprint pattern imposable thereon, said fingerprint pattern constituting the ridges and valleys of a real finger;

a cathode ray spot scanner;

second means in optical relationship with respect to the first means for directing a light beam from the spot scanner on said first means and for scanning said first means and said pattern;

third means optically coupled to said second means for edge-illuminating said first means thereby causing illumination of said ridges and interference with diffused reflection of light therefrom thereby accentuating the ridges of the print from the finger by virtue of the edge illumination, and in the absence of said finger disabling any substantial amount of light originating from the third means causing said diffused diffused fourth means for receiving light in accordance with modulation of the light beam by said pattern;

fifth means electrically coupled to the cathode ray spot scanner for providing video control of the received fingerprint pattern;

seventh means connected to the fifth means, said seventh means including video display means and a photographic plate for optically providing a photograph of said fingerprint pattern;

means for sequentially positioning the beam of said cathode ray spot scanner at coordinate locations along rectilinear axes including means for sequentially scanning the pattern at each of the coordinate locations with a plurality of successive polar scans having polar radii of different magnitudes for scanning a plurality of portions of each of the coordinate locations;

means for generating digital signals at successive points of each of said plurality of successive polar scans, said digital signals indicating the contrast at each point of the polar scan pattern at each of the coordinate locations; and means for registering the digital signals, generated by each of said plurality of polar scans, for transfer thereof externally to said apparatus.

8. Apparatus for determining the characteristics of a fingerprint pattern, comprising in combination:

first means with said fingerprint pattern imposable thereon, said fingerprint pattern constituting the ridges and valleys of a real finger;

a cathode ray spot scanner;

second means in optical relationship with respect to the first means for directing a light beam from the spot scanner on said first means and for scanning said first means and said pattern;

third means optically coupled to said second means for edge-illuminating said first means thereby causing illumination of said ridges and interference with diffused reflection of light therefrom thereby accentuating the ridges of the print from the finger by virtue of the edge illumination, and in the absence of said finger disabling any substantial amount of light originating from the third means causing said diffused reflection;

fourth means for receiving light in accordance with modulation of the light beam by said pattern;

fifth means electrically coupled to the cathode ray spot scanner for providing video control of the received fingerprint pattern;

eighth means connected to the fifth means, said eighth means including video display means having a cathode ray line-scan tube and a wired faceplate coupled to a fingerprint card for deposition of electrostatic charges upon said fingerprint card;

an electrostatic printer in receiving relationship to the fingerprint card having an electrostatic charge on said card for electrostatically producing the image of the fingerprint on said fingerprint card;

means for sequentially positioning the beam of said cathode ray spot scanner at coordinate locations along rectilinear axes including means for sequentially scanning the pattern at each of the coordinate locations with a plurality of successive polar scans having polar radii of different magnitudes for scanning a plurality of portions of each of the coordinate locations;

means for generating digital signals at successive points of each of said plurality of successive polar scans, said digital signals indicating the contrast at each point of the polar scan pattern at each of the coordinate locations; and means for registering the digital signals, generated by each of said plurality of polar scans, for transfer thereof externally to said apparatus.

9. The invention as stated in claim 1, including:
means for providing recognition of the characteristics of said fingerprint pattern irrespective of the angular orientation of the fingerprint pattern.

10. The invention as stated in claim 1, including:
means connected to the means for sensing for providing an alarm whenever said substitution is sensed.

* * * * *